(12) United States Patent
Buchanan et al.

(10) Patent No.: US 10,625,649 B2
(45) Date of Patent: Apr. 21, 2020

(54) MECHANISM TO ACHIEVE EXPANDABLE TRAY TABLE

(71) Applicant: B/E Aerospace, Inc., Winston-Salem, NC (US)

(72) Inventors: Tyler P. Buchanan, Chippewa Falls, WI (US); Joseph M. Stuttgen, Stanley, WI (US); Ryan J. Suhre, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 72 days.

(21) Appl. No.: 15/949,717

(22) Filed: Apr. 10, 2018

(65) Prior Publication Data

US 2019/0308538 A1    Oct. 10, 2019

(51) Int. Cl.
| | | |
|---|---|---|
| *B60N 3/00* | (2006.01) | |
| *B64D 11/06* | (2006.01) | |
| *A47B 1/10* | (2006.01) | |
| *A47B 17/03* | (2006.01) | |

(52) U.S. Cl.
CPC ............. *B60N 3/004* (2013.01); *A47B 1/10* (2013.01); *A47B 17/03* (2013.01); *B64D 11/0638* (2014.12)

(58) Field of Classification Search
CPC ........ B60N 3/004; B60N 3/001; B60N 3/002; B64D 11/0638; B64D 11/0646; B64D 11/0605; A47B 1/10; A47B 17/03; A47B 3/0818; B61D 37/00; A47C 7/70; B29L 2031/448; B29K 2101/12; B27N 5/00
USPC ..... 108/137, 143, 44, 42, 139, 140, 142, 35, 108/38, 39, 93, 102, 103; 296/24.35, 296/24.34, 1.09, 37.8; 297/188.21, 157.1, 297/158.2, 158.4, 162, 163, 173, 164; 312/334.23, 334.26
See application file for complete search history.

(56) References Cited

U.S. PATENT DOCUMENTS

| | | | | |
|---|---|---|---|---|
| 2,168,210 A | * | 8/1939 | Hawksley | B60N 3/004 108/38 |
| 2,554,685 A | * | 5/1951 | St Denis | B60N 3/002 108/45 |
| 3,847,462 A | * | 11/1974 | Repetti | A47B 88/407 312/334.23 |
| 4,174,669 A | * | 11/1979 | Lalonde | B60N 3/002 108/44 |
| 5,443,018 A | * | 8/1995 | Cromwell | B60N 3/004 108/44 |

(Continued)

FOREIGN PATENT DOCUMENTS

| | | | |
|---|---|---|---|
| DE | 102016011850 | * | 4/2018 |
| EP | 1160125 | * | 12/2001 |
| GB | 1151940 | * | 5/1969 |

*Primary Examiner* — Janet M Wilkens
(74) *Attorney, Agent, or Firm* — Clements Bernard Walker Law

(57) ABSTRACT

A tray table assembly including a main table and a table extension deployable from a stowed position below the main table to a deployed position laterally adjacent the main table. The main table and the table extension are coupled through an intermediate support slidably coupled to each of the main table and the table extension. The deploy the table extension, the table extension slides relative to the intermediate support and the intermediate support slides relative to the main table to increase the total surface area of the table top as needed.

7 Claims, 10 Drawing Sheets

(56) References Cited

U.S. PATENT DOCUMENTS

| | | | | |
|---|---|---|---|---|
| 5,588,697 | A * | 12/1996 | Yoshida | A47B 13/16 108/160 |
| 5,820,194 | A * | 10/1998 | Slayter | B60N 3/001 296/70 |
| 5,931,527 | A * | 8/1999 | D'Onofrio | B60R 5/045 297/146 |
| 6,394,001 | B1 * | 5/2002 | Giesey | B60N 3/002 108/44 |
| 10,185,495 | B2 * | 1/2019 | Katsuki | G06F 3/0608 |
| 10,285,495 | B1 * | 5/2019 | Valme | A47B 3/10 |
| 2012/0167807 | A1 * | 7/2012 | Legeay | B60N 3/002 108/41 |
| 2013/0284074 | A1 * | 10/2013 | Satterfield | A47B 31/06 108/63 |
| 2015/0284090 | A1 * | 10/2015 | Stephens | B64D 11/0638 297/163 |
| 2017/0021931 | A1 * | 1/2017 | Stephens | B64D 11/0638 |

* cited by examiner

MECHANISM TO ACHIEVE EXPANDABLE TRAY TABLE

BACKGROUND

The inventive concepts disclosed herein relate generally to a deployable tray table, and more particularly, to a deployable tray table having a main table and a table extension that transitions from a stowed position below the main table to a deployed position alongside the main table to expand the total surface area of the tray table.

Aircraft tray tables are used for a variety of different purposes including, but not limited to, dining, writing, reading, supporting electronic devices such as laptops and tablets, and as a general work surface.

Tray tables are typically configured to deploy from a stowed position against a seatback or from within an armrest housing positioned alongside a passenger seat. Tray tables that deploy from against a seatback can be latched in a stowed position against the seatback and rotate downward to horizontal for use. Tray tables that deploy from within an armrest can stow perpendicular to the floor of the aircraft, perpendicular to the seatback, or parallel to an elongate arm rest.

The aforementioned tray table configurations have a table top surface area limited by the size of the seat back or housing against or within which the tray table is stowed. In other words, considering the tray table must stow for taxi, take-off and landing, table size is limited by the space available to stow the tray table when not in use. As such, usable table top surface area is too small for activities such as dining and working.

To address table top surface area limitations, expandable tray tables have been developed which include hinged table parts that unfold to increase the overall surface area. Hinged table parts suffer from hinge constraints, bulk and undesirable gaps in the table top surface, among other limitations. As such, what is needed is an expandable tray table that provides a large table top surface area free of gaps and without the disadvantages associated with hinges, while at the same time minimizing stowage space.

SUMMARY

In one aspect, embodiments of the inventive concepts disclosed herein are directed to a tray table assembly including a main table, a table extension deployable from a stowed position below the main table to a deployed position laterally adjacent the main table, and an intermediate support disposed between the main table and the table extension, the intermediate support slidably coupled to each of the main table and the table extension.

In another aspect, to deploy the table extension the main table may remain static, the intermediate support may slide relative to the main table without rotating, and the table extension may slide relative to the intermediate support without rotating.

In a further aspect, the intermediate support may include first and second parallel guide rails each slidably coupled to each of the main table and the table extension.

In a further aspect, the main table may include first and second elongate parallel guides within which the respective first and second guide rails slide to translate the intermediate support relative to the main table, and the table extension may include first and second elongate parallel guides within which the respective first and second guide rails slide to translate the table extension relative to the intermediate support.

In a further aspect, the first guide of the main table, the first guide of the table extension, and the first guide rail may be linearly aligned, and wherein the second guide of the main table, the second guide of the table extension, and the second guide rail may be linearly aligned.

In a further aspect, the main table may include a base and a table top, the table top configured to lower onto the base when the table extension is laterally adjacent and clear of the main table such that a top surface of the table extension and a top surface of the table top horizontally align when the table extension is fully deployed.

In a further aspect, the table extension when in the stowed position thereof may be disposed between the base and the table top.

In a further aspect, the main table may be adapted to be slidably and rotatably coupled along one side thereof to an end bay hinge.

In a further aspect, the main table may be adapted to be slidably coupled to a seat back arm assembly.

In another aspect, the inventive concepts disclosed herein are directed to a tray table assembly including a main table comprising a base and a table top movable relative to the base, a table extension deployable from a stowed position between the base and the table top to a deployed position laterally adjacent to the table top, and an intermediate support disposed between the base and the table extension, the intermediate support slidably coupled to each of the base and the table extension.

In another aspect, to deploy the table extension the base may remain static, the intermediate support may slide relative to the base, the table extension may slide relative to the intermediate support, and the table top may lower onto the base when the table extension is laterally adjacent and clear of the base.

In another aspect, the base may include a ramped edge facing the table extension when the table extension is in the deployed position, the ramped edge facilitating and guiding initial movement of the table extension from the deployed position toward the stowed position.

In another aspect, a top surface of the table top and a top surface of the table extension may be horizontally aligned when the table extension is fully deployed.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
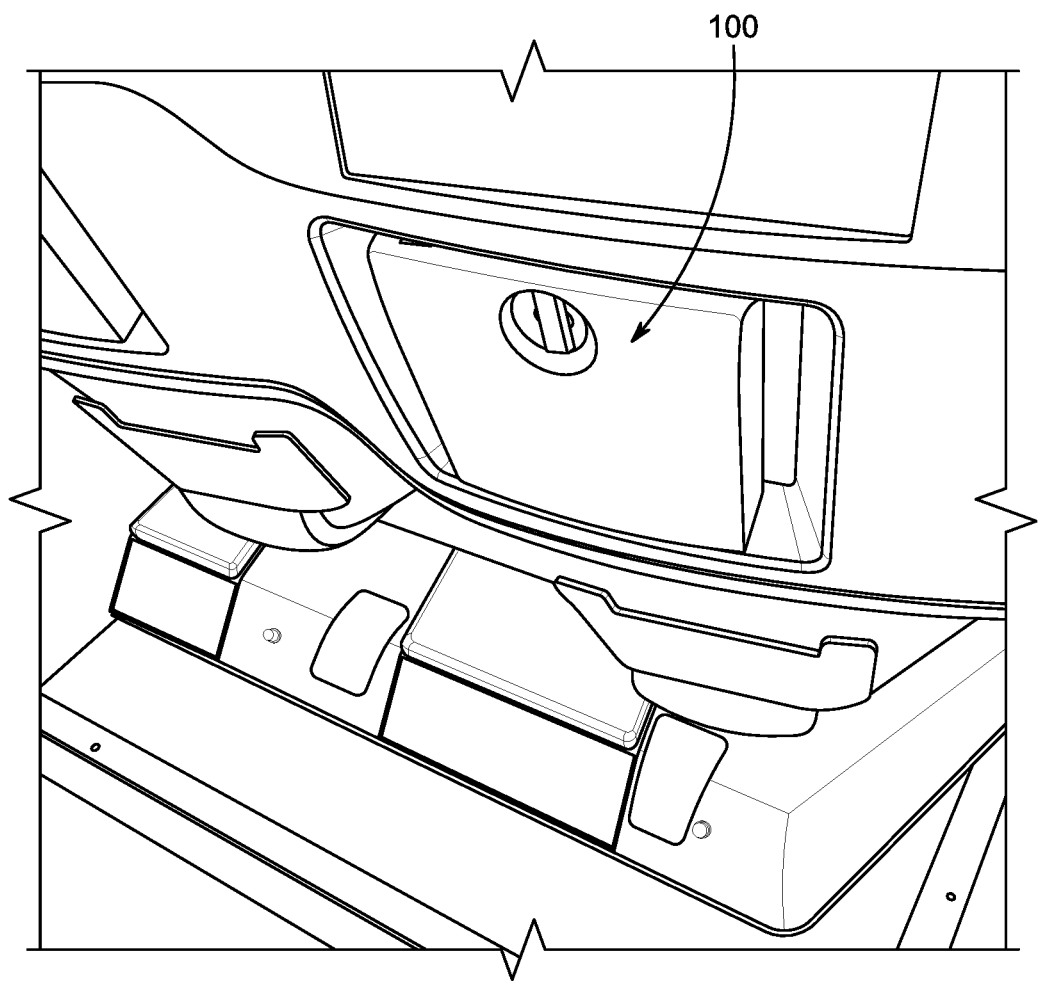
FIG. 1 is a fragmentary perspective view of a passenger seat back, showing an expandable tray table according to a first embodiment and in a stowed position.

The inventive concepts disclosed herein are generally directed to a tray table having an extension that deploys to increase the surface area of the tray table. The tray table includes a main table that stays in place and an extension that slides from beneath the main table. Once the extension slides clear of the main table, the main table lowers into place to provide a flush table surface made up of the main table and the extension. The mechanism by which the table expands includes a full extension slide and an intermediate component that supports the main table and extension when the tray table is fully extended. The full extension slide may utilize thin elements to achieve a low overall table thickness. The non-sliding portion of the table utilizes small links to allow the main table to move up and down with low-friction and positive location.

Referring to the drawing figures, the inventive concepts disclosed herein are generally directed to an expandable tray table assembly. The expandable tray table assembly, also referred to herein as the "tray table", is adapted to be affixed to various hinge assemblies including, but not limited to, seat back hinges, end bay hinges, arm assemblies, etc. According to a first embodiment of the invention, the tray table is shown affixed to an arm assembly configured to transition the tray table between a stowed position against the backside of a seat back, to a deployed position apart from the seat back. In a particular embodiment, the tray table can rotate from near vertical when stowed to near horizontal when fully deployed. According to a second embodiment of the invention, the tray table is shown slidably coupled to an end bay hinge operable for transitioning the tray table from a vertical orientation stowed within an end bay positioned alongside a passenger seat, to a deployed horizontal position over the lap or forward of a seated passenger. The hinge to which the tray table attaches, the manner in which the tray table attaches to the hinge, and the transition between the stowed and deployed positions of the tray table are not critical to the inventive concepts disclosed herein.

Referring to FIG. 1, the tray table 100 is shown fully stowed in a near vertical orientation against the seat back within a recess defined in the seat back shroud. The table can be latched in the stowed positions utilizing various conventional latch configurations.

Figure 2:
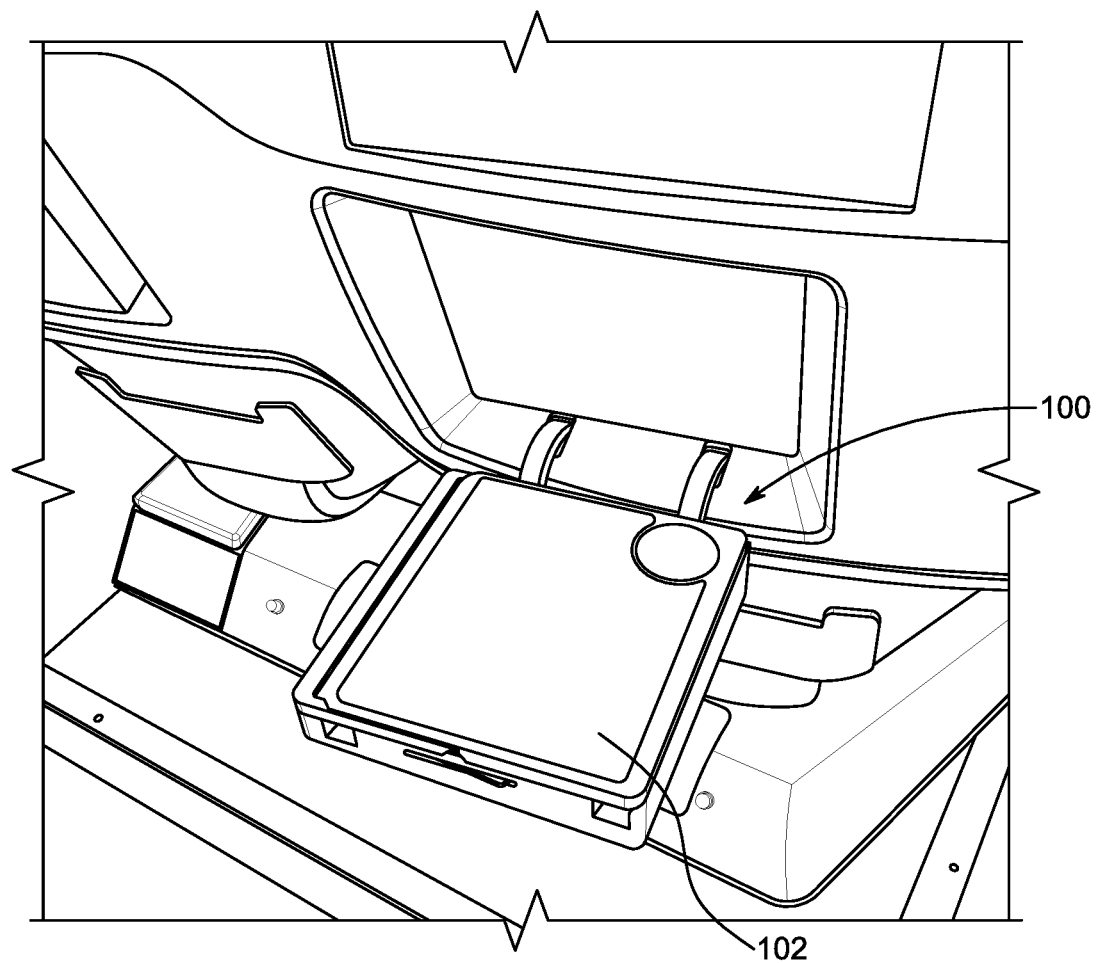
FIG. 2 is a fragmentary perspective view of the seat back, showing the main table partially deployed.

Referring to FIG. 2, the tray table 100 is shown partially deployed such that the tray table is rotated to substantially horizontal. In this position, a main table 102 is positioned for use during flight, and has a predetermined usable surface area about half the surface area of the total surface area when the table extension is fully deployed. As shown, the main table 102 is positioned proximate the seat back and thus spaced apart from the seated passenger in an aft-positioned seat.

Figure 3:
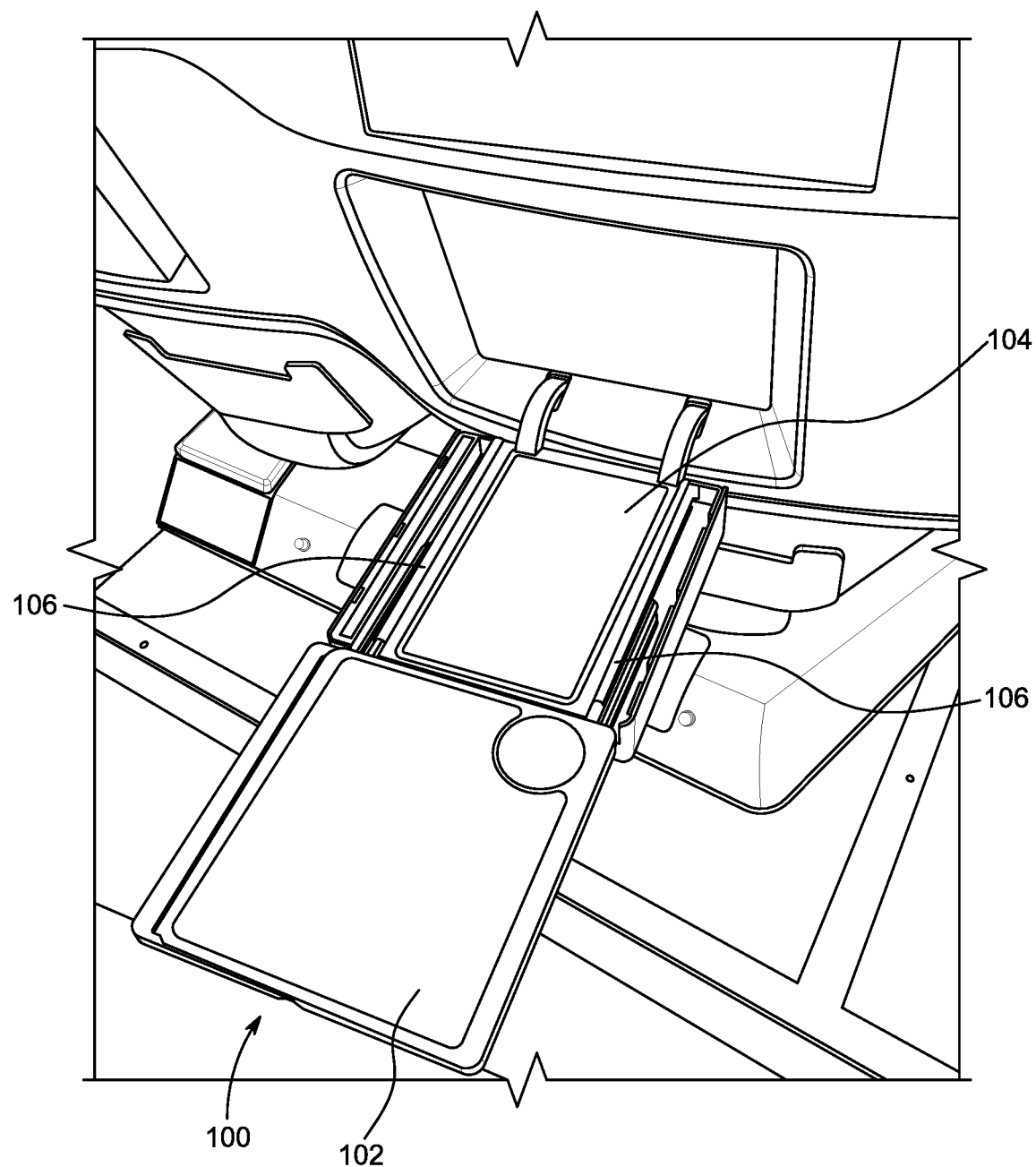
FIG. 3 is a fragmentary perspective view of the seat back, showing the main table fully deployed.

Referring to FIG. 3, the tray table 100 is shown partially deployed and slid in a direction of the seated passenger served by the tray table. The main table 102 is horizontal for use, as well as the hinge base 104 that supports the tray table 100. The main table 102 and the hinge base 104 are aligned end-to-end. The tray table 100 can be coupled to the hinge base 104 by way of slides including, but not limited to, three-piece drawer slides 106 each including a first component affixed to the hinge base 104, a second component affixed to the tray table 100, and a third component interconnecting the first and second components. In this configuration, the third component slides relative to the first and second components to move the tray table 100 apart or toward the hinge base 104.

Figure 4:
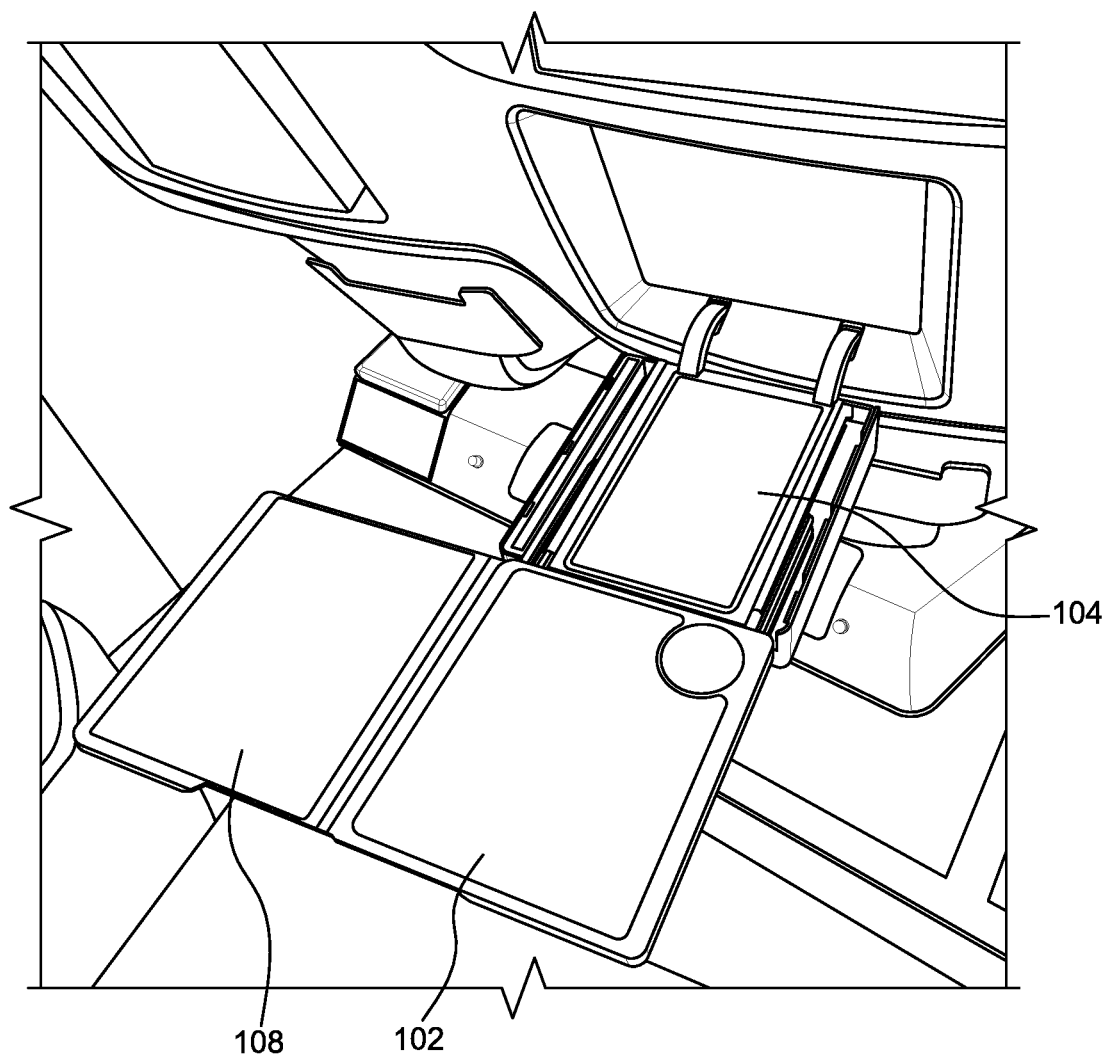
FIG. 4 is a fragmentary perspective view of the seat back, showing the main table and the table extension fully deployed.

Referring to FIG. 4, the table extension 108 is shown fully deployed, thus substantially doubling the surface area of the main table 102. The table extension 108 deploys from a stowed position below the main table 102 to a fully deployed position laterally-adjacent the main table 102. Once the table extension 108 is fully deployed and clear of the main table 102, the main table or a portion thereof, lowers into place such that the top surface of the main table 102 is horizontally aligned with a top surface of the table extension 108 to provide a substantially continuous table surface. Preferably, the adjoining sides of the main table 102 and the table extension 108 are in direct physical contact to avoid or minimize any gap between the table tops. The deployment sequence can be reversed to stow the tray table 100.

Figure 5:
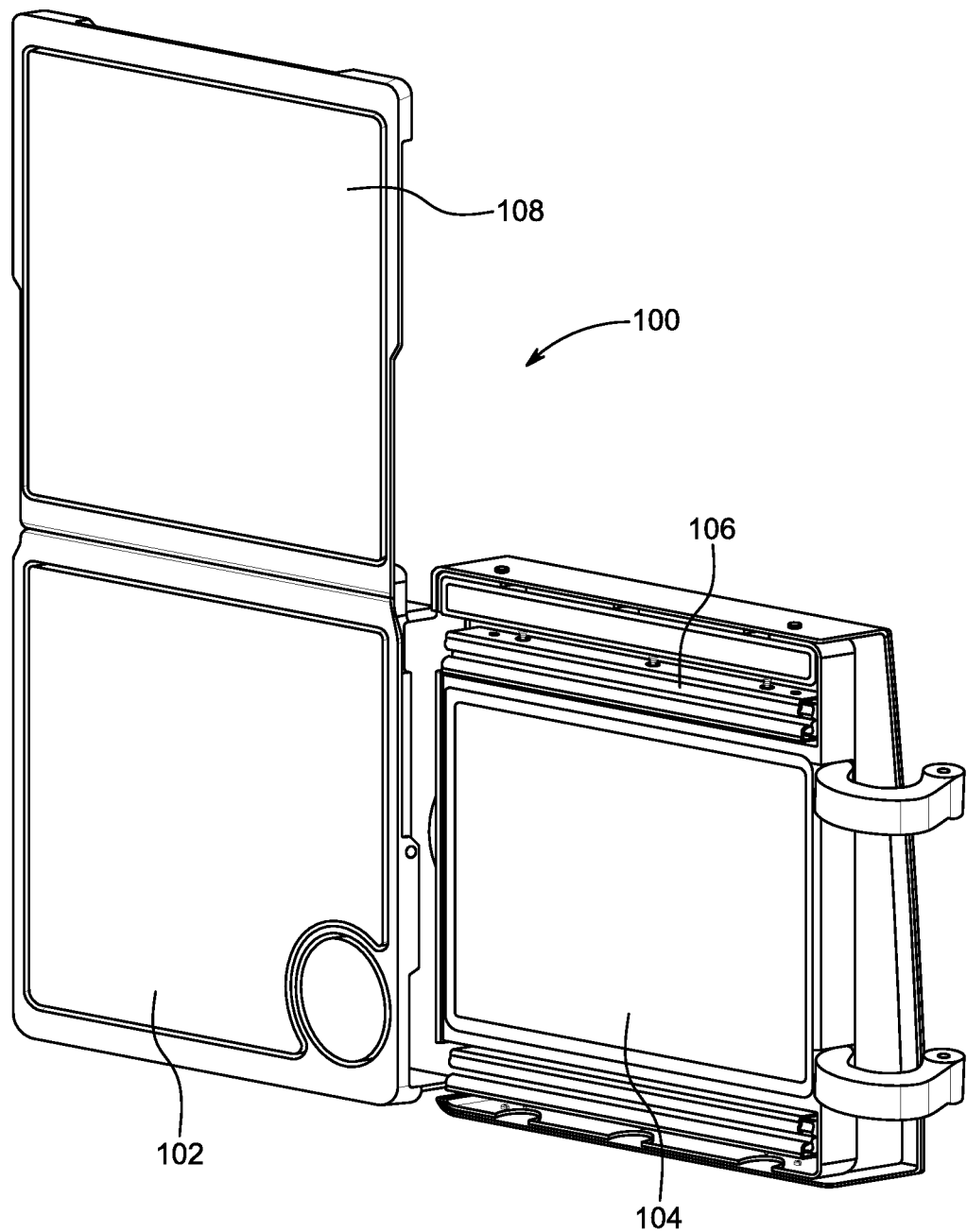
FIG. 5 is a top perspective view of the tray table, showing the table extension fully deployed.
Figure 6:
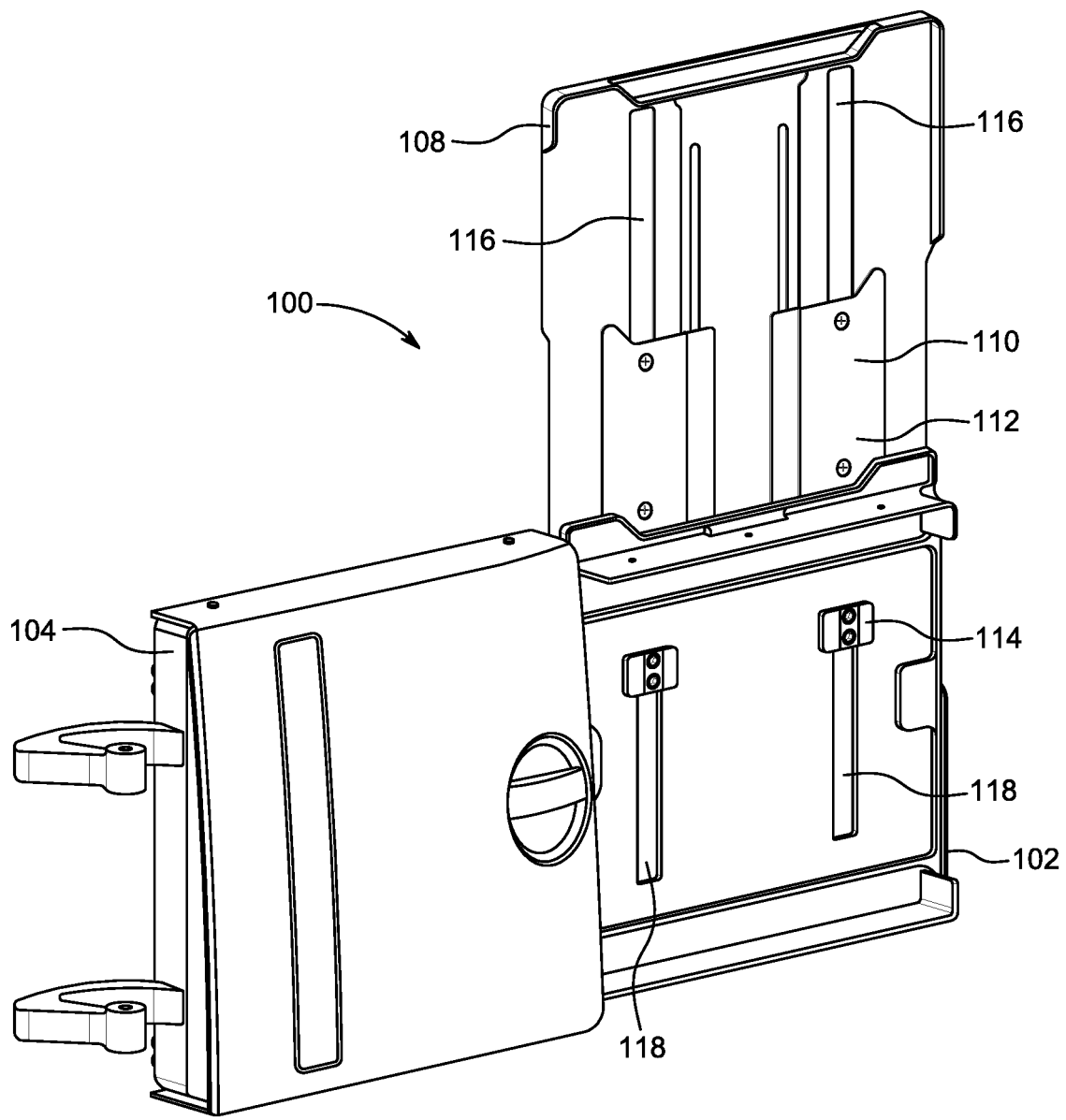
FIG. 6 is a bottom perspective view of the tray table, showing the table extension fully deployed.

FIGS. 5 and 6 further illustrate the tray table 100, albeit showing the drawer slides disconnected from the hinge base 104. In the particular embodiment shown in FIGS. 5 and 6, the table top can have three usable surfaces when the tray table is farthest from the attached seat back, and two usable surfaces when the tray table is closest to the seat back. The tray table 100 can slide relative to the hinge base 104 regardless of whether the table extension 108 is stowed or deployed, allowing seat egress without having to fully stow the tray table.

Referring specifically to FIG. 6, the tray table 100 generally includes the main table 102, the table extension 108, and an intermediate support 110. The intermediate support 110 can be provided as a unitary component or separate spaced apart components. The intermediate support 110 is disposed between the main table 102 and the table extension 108, as is slidably coupled to each of the main table 102 and the table extension 108. The intermediate support generally includes first and second parallel guide rails each slidably coupled to each of the main table 102 and the table extension 108, or as shown, a first part 112 slidably coupled to the main table 102 and a guide block 114 slidably coupled to the table extension 108.

In a particular configuration, the main table 102 includes first and second elongate parallel guides 116 within which the respective first and second guide rails slide to translate the intermediate support 110 relative to the main table 102, and the table extension 108 includes first and second elongate parallel guides 118 within which the respective first and second guide rails slide to translate the table extension 108 relative to the intermediate support 110. The first guide of the main table, the first guide of the table extension, and the first guide rail may be linearly aligned, while the second guide of the main table, the second guide of the table extension, and the second guide rail may also be linearly aligned, thus maintaining squareness as the table extension stows and deploys.

Figure 7:
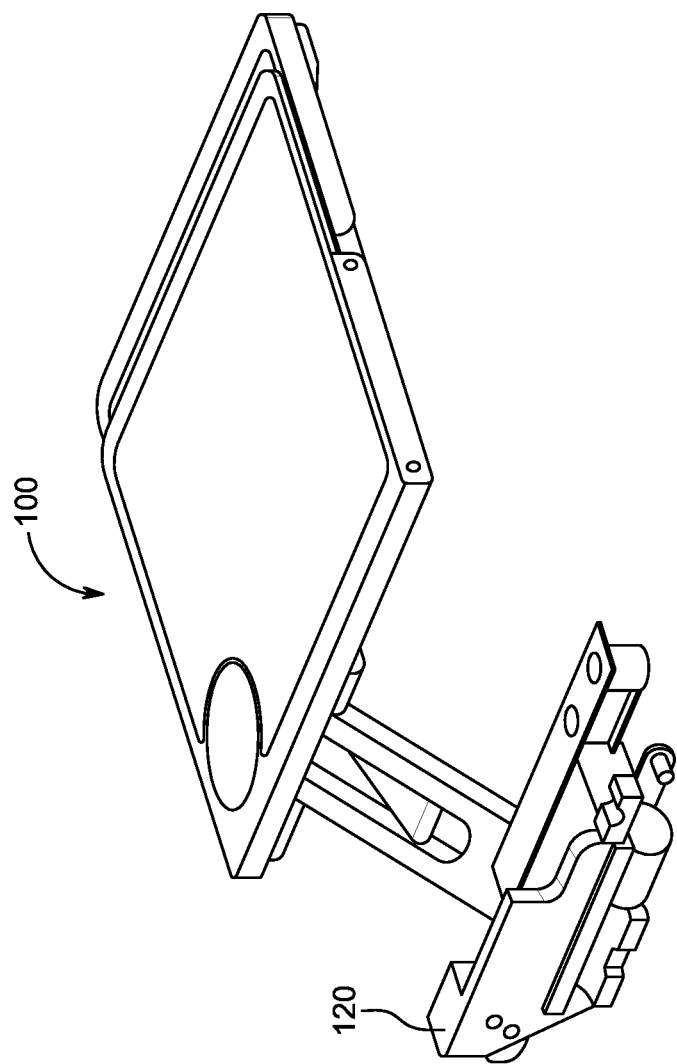
FIG. 7 is a perspective view of a tray table according to a second embodiment of the invention, showing the table extension fully stowed.

Referring to FIG. 7, the tray table 100 according to a second embodiment shown affixed to an end bay hinge 120. The tray table 100 may be translationally coupled to the hinge 120 to permit fore and aft positioning, and may also be rotationally coupled to the hinge 120 to permit the tray table to rotate between vertical and horizontal orientations for respective stowing and use. The hinge 120 may attach near one side of the bottom of the tray table, and the tray table may extend away from the hinge to position the tray table, in use, in an over-seat position. The tray table 100 shown in FIG. 7 is deployed, but with the table extension fully stowed.

Figure 8:
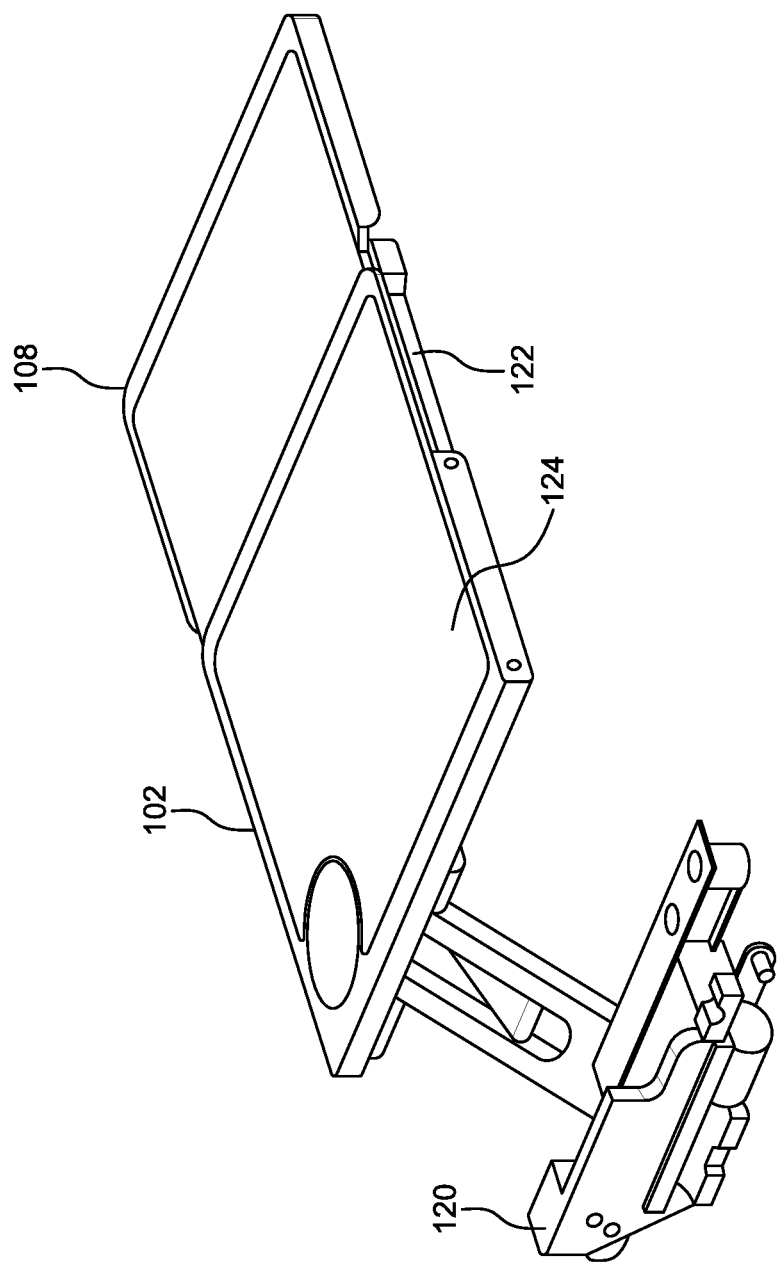
FIG. 8 is a perspective view of the tray table, showing the table extension partially deployed.

Referring to FIG. 8, the table extension 108 deploys from a stowed position below the main table 102 to the partially deployed position shown by sliding apart from the main table 102. In a particular embodiment, the main table 102 includes a base 122 and a table top 124, the table top configured to lower onto the base 122 when the table extension is laterally adjacent and clear of the main table 102 such that a top surface of the table extension and a top surface of the table top horizontally align when the table extension 108 is fully deployed. In this configuration, the table extension 108 may stow between the base 122 and the table top 124, and deploys to a position laterally-adjacent the main table 102. The table top 124 may be coupled to the base 122 through links or a pivot that allows the table top to move up and down with low friction and positive location.

Figure 9:
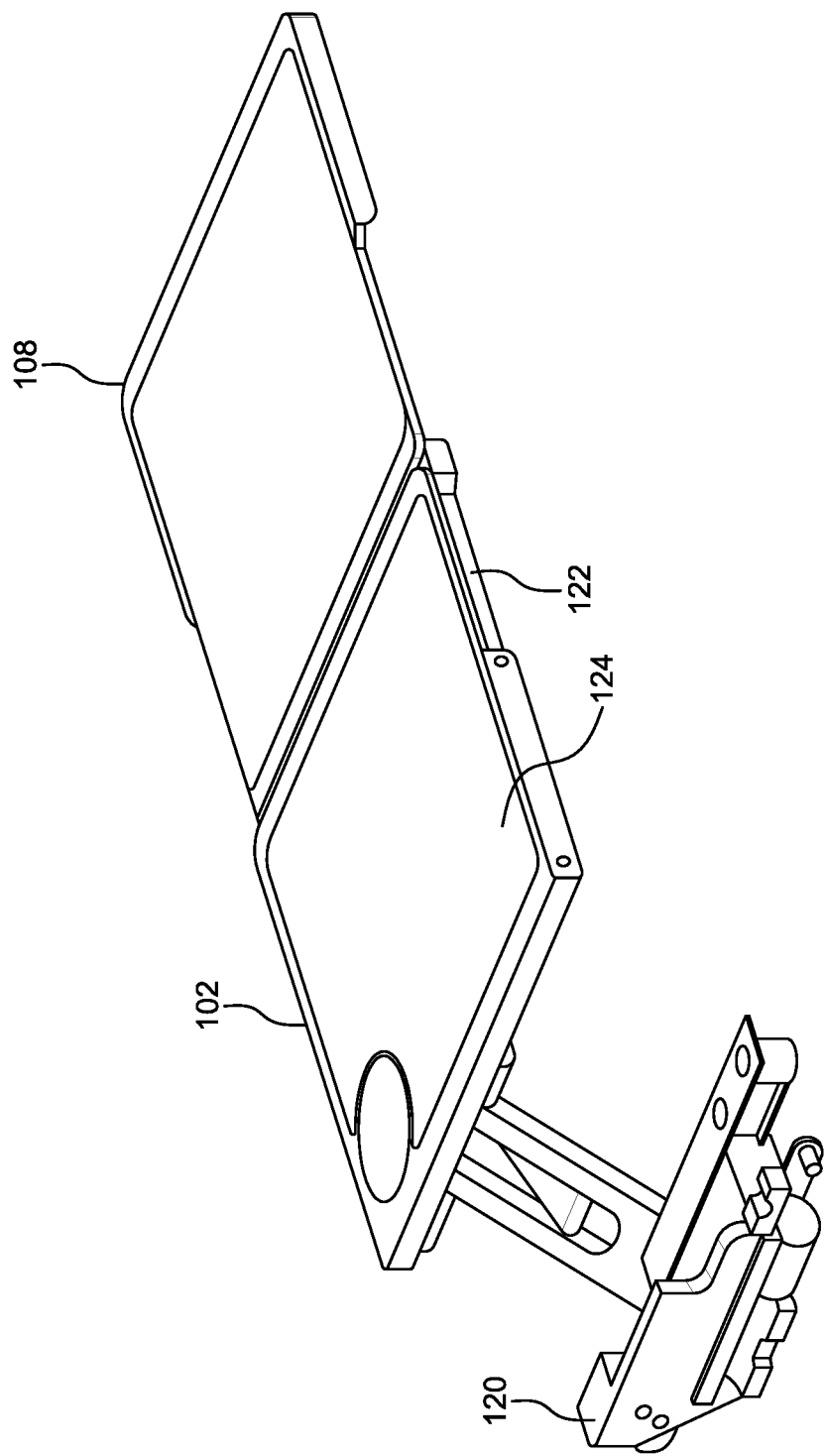
FIG. 9 is a perspective view of the tray table, showing the table extension fully deployed.

Referring to FIG. 9, the table extension 108 is shown fully deployed and laterally adjacent the main table 102, and the table top 124 is shown lowered into position horizontally aligned with the table extension 108. An edge of the main table 102 facing the table extension 108 when fully deployed may be ramped to facilitate and guide table extension movement toward the stowed position thereof.

Figure 10:
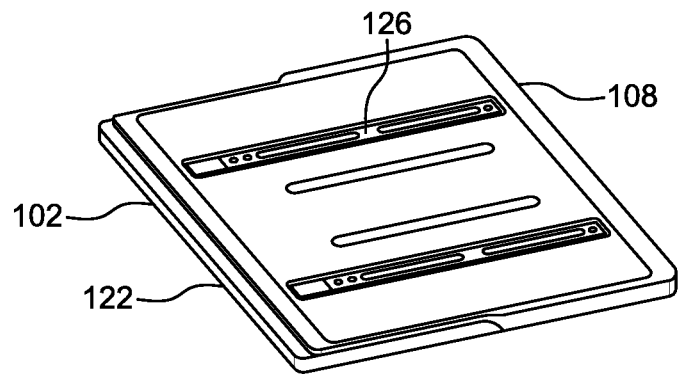
FIG. 10 is a perspective view of the expandable tray table, showing the table extension fully stowed and the top cover removed for clarity.
Figure 11:
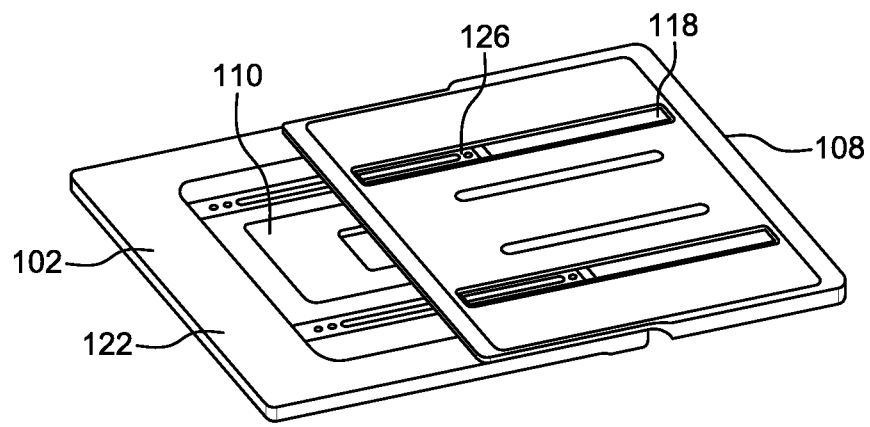
FIG. 11 is a perspective view of the tray table, showing the table extension partially deployed and with the table top covers removed for clarity.
Figure 12:
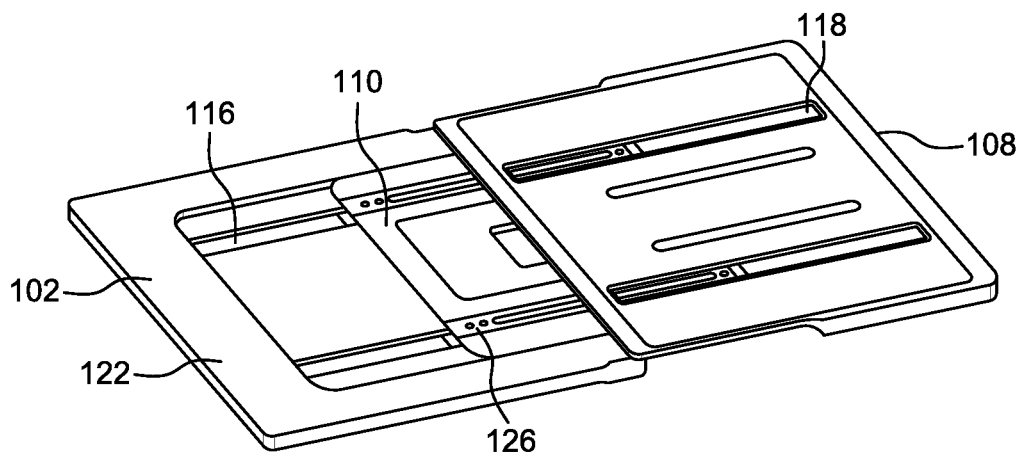
FIG. 12 is a perspective view of the tray table, showing the table extension nearly fully deployed and the table top covers removed for clarity.
Figure 13:
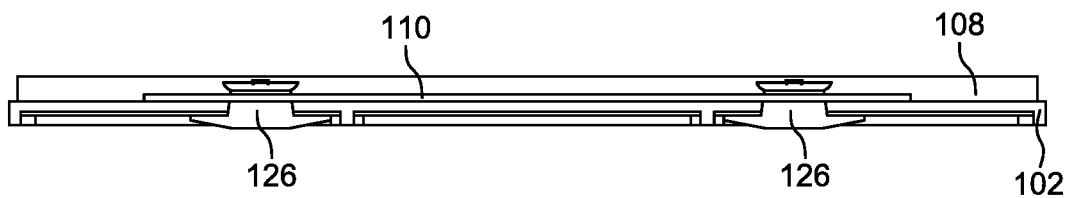
FIG. 13 is a sectional view through the tray table taken along line 13-13 of FIG. 10.

FIGS. 10-12 show a particular guide rail configuration and tray extension deployment motion. FIG. 10 shows the table extension 108 fully stowed below the main table 102 or base 122. The main table 102 includes first and second elongate parallel guides 116 within which the respective first and second guide rails 126 of the intermediate support 110 slide to translate the intermediate support 110 relative to the main table 102 or base 122, and the table extension 108 includes first and second elongate parallel guides 118 within which the respective first and second guide rails 126 slide to translate the table extension 108 relative to the intermediate support 110. The intermediate support 110 stows in a recess defined in the table extension to achieve a thin vertical profile. Stops may be provided to limit travel of the guide rails within their respective guides. Alternatively, the guide length may be determinative of the length of travel, which can be customized. Referring to FIG. 13, the sectional view through the tray table 100 illustrates the thin vertical profile and guide rail arrangement with respect to the main table 102 and table extension 108.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A tray table assembly, comprising:
a main table;
a table extension deployable from a stowed position below the main table to a deployed position laterally adjacent the main table; and
an intermediate support disposed between the main table and the table extension, the intermediate support slidably coupled to each of the main table and the table extension,
wherein the main table comprises a base and a table top, the table top configured to lower onto the base when the table extension is laterally adjacent and clear of the main table such that a top surface of the table extension and a top surface of the table top horizontally align when the table extension is fully deployed.

2. The tray table assembly of claim 1, wherein to deploy the table extension the main table remains static, the intermediate support slides relative to the main table without rotating, and the table extension slides relative to the intermediate support without rotating.

3. The tray table assembly of claim 1, wherein the intermediate support comprises first and second parallel guide rails each slidably coupled to each of the main table and the table extension.

4. The tray table assembly of claim 3, wherein the main table comprises first and second elongate parallel guides within which the respective first and second guide rails slide to translate the intermediate support relative to the main table, and the table extension comprises first and second elongate parallel guides within which the respective first and second guide rails slide to translate the table extension relative to the intermediate support.

5. The tray table assembly of claim 4, wherein the first guide of the main table, the first guide of the table extension, and the first guide rail are linearly aligned, and wherein the second guide of the main table, the second guide of the table extension, and the second guide rail are linearly aligned.

6. The tray table assembly of claim 1, wherein the table extension when in the stowed position thereof is disposed between the base and the table top.

7. The tray table assembly of claim 1, wherein the main table is adapted to be slidably coupled to a seat back arm assembly.

* * * * *